(12) United States Patent
Johnson

(10) Patent No.: US 9,657,763 B2
(45) Date of Patent: May 23, 2017

(54) LOCKING QUICK-RELEASE PIN ASSEMBLY

(71) Applicant: The Boeing Company, Chicago, IL (US)

(72) Inventor: Dennis R. Johnson, Mukilteo, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/850,267

(22) Filed: Sep. 10, 2015

(65) Prior Publication Data

US 2017/0074309 A1    Mar. 16, 2017

(51) Int. Cl.
*F16B 19/00*    (2006.01)
*F16B 37/14*    (2006.01)

(52) U.S. Cl.
CPC .............. *F16B 19/00* (2013.01); *F16B 37/14* (2013.01); *Y10T 70/5628* (2015.04); *Y10T 70/5637* (2015.04); *Y10T 70/5867* (2015.04)

(58) Field of Classification Search
CPC .......... F16B 19/00; F16B 37/14; Y10S 70/57; Y10S 292/37; E05B 70/5615; Y10T 70/5619; Y10T 70/5624; Y10T 70/5628; Y10T 70/5633; Y10T 70/5637; Y10T 70/443; Y10T 70/5867; Y10T 70/7751
USPC ............. 70/175–180, 34, 386, 232, DIG. 57; 292/DIG. 37; 411/348; 280/507
See application file for complete search history.

(56) References Cited

U.S. PATENT DOCUMENTS

| | | | | |
|---|---|---|---|---|
| 545,260 | A * | 8/1895 | Wheelwright | G09F 3/037 292/307 A |
| 716,204 | A * | 12/1902 | De Waldo | F16B 41/005 285/80 |
| 1,131,821 | A * | 3/1915 | Campbell | F16K 35/10 137/382 |
| 1,333,309 | A * | 3/1920 | Hause | F16K 35/10 137/384 |
| 1,357,463 | A * | 11/1920 | McCarthy | F16K 35/10 137/382 |
| 1,683,649 | A * | 9/1928 | Belote | F16K 35/10 70/178 |
| 1,986,128 | A * | 1/1935 | Trott | F16K 35/06 70/177 |
| 2,623,380 | A * | 12/1952 | Lee | F16K 35/10 70/178 |
| 3,067,846 | A * | 12/1962 | Luebkeman | E02D 5/801 52/157 |
| 3,117,484 | A * | 1/1964 | Myers | F16B 5/0208 411/348 |
| 3,181,523 | A * | 5/1965 | Casey | H01T 13/06 123/169 PH |

(Continued)

OTHER PUBLICATIONS

"Main Gear Individual Lock Pin," Aeropin, Inc. copyright 2008, 2 pages, accessed Oct. 2, 2015. http://www.aeropin.com/pin3.html.

*Primary Examiner* — Lloyd Gall
(74) *Attorney, Agent, or Firm* — Yee & Associates, P.C.

(57) ABSTRACT

A method and apparatus for a locking quick-release pin assembly. A cover comprises a body with an opening at a first end, a domed second end, and a plurality of tabs extending from the body. Each tab of the plurality of tabs has a hole. Each hole is concentric with another hole of another tab of the plurality of tabs.

21 Claims, 12 Drawing Sheets

(56) References Cited

U.S. PATENT DOCUMENTS

| | | | | |
|---|---|---|---|---|
| 3,200,690 A * | 8/1965 | Dickman | F16B 19/02 | 411/337 |
| 3,206,955 A * | 9/1965 | Horovitz | B65D 55/14 | 215/207 |
| 3,312,794 A * | 4/1967 | Hollyday | H01H 9/282 | 200/293 |
| 3,343,387 A * | 9/1967 | Cochran | E05B 13/001 | 70/424 |
| 3,623,346 A * | 11/1971 | Curtin | E05B 17/142 | 70/424 |
| 3,739,608 A * | 6/1973 | Young | E05B 13/001 | 70/209 |
| 3,980,099 A * | 9/1976 | Youngblood | F16K 35/10 | 137/382 |
| 4,648,254 A * | 3/1987 | Bloemers | E05B 73/0076 | 70/212 |
| 5,058,622 A * | 10/1991 | Chitty, Jr. | F16K 35/06 | 137/385 |
| 5,141,119 A * | 8/1992 | Milazzo | B60R 25/007 | 212/290 |
| 5,311,756 A * | 5/1994 | Villani | B60R 25/006 | 70/202 |
| 5,806,555 A * | 9/1998 | Magno, Jr. | E05B 13/00 | 137/385 |
| 6,170,306 B1 * | 1/2001 | Kitley | F16K 35/10 | 137/382 |
| 6,532,702 B1 * | 3/2003 | Scribner | E06B 9/02 | 411/348 |
| 6,718,804 B1 * | 4/2004 | Graves | F16K 27/12 | 137/553 |
| 6,843,083 B2 * | 1/2005 | Smith | F16K 35/10 | 137/385 |
| 7,219,685 B1 * | 5/2007 | Espinoza | F16K 35/06 | 137/385 |
| 7,503,194 B2 * | 3/2009 | McNeil | E05B 67/383 | 248/552 |
| 2004/0118169 A1 * | 6/2004 | Donath | E05B 39/02 | 70/177 |
| 2004/0118170 A1 * | 6/2004 | Smith | F16K 35/10 | 70/178 |
| 2008/0029529 A1 * | 2/2008 | Ruhl | B65D 90/008 | 220/890 |
| 2009/0272157 A1 * | 11/2009 | Alaniz | B60R 25/08 | 70/174 |
| 2010/0108921 A1 * | 5/2010 | Milbeck | F16K 35/10 | 251/90 |
| 2010/0206022 A1 * | 8/2010 | Katz | B62H 5/18 | 70/233 |
| 2012/0042700 A1 * | 2/2012 | Barron | E05B 17/106 | 70/15 |

* cited by examiner

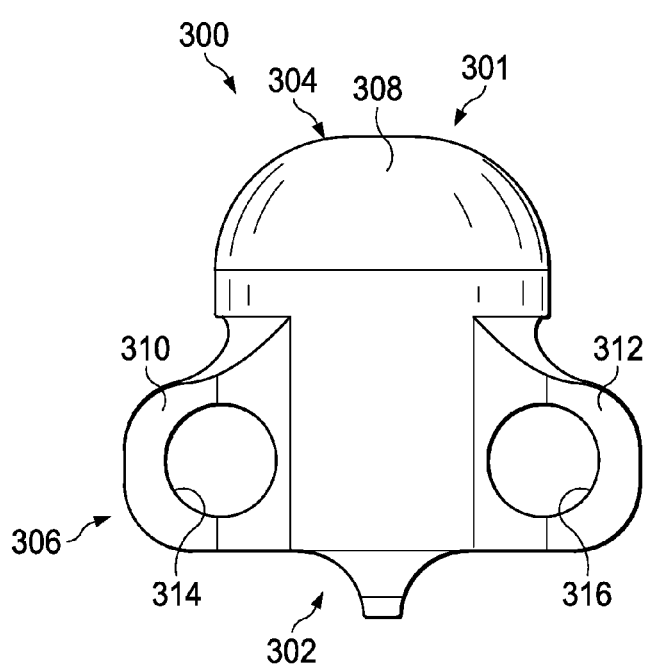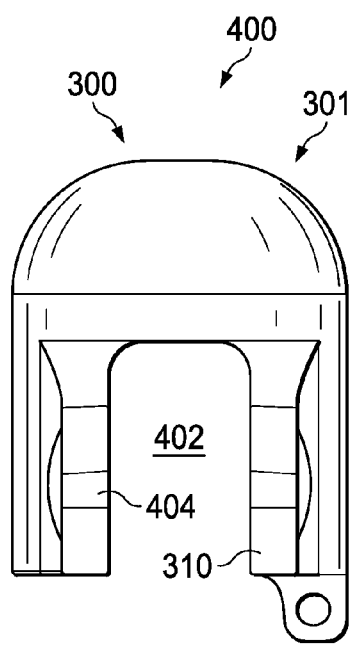
FIG. 3
FIG. 4
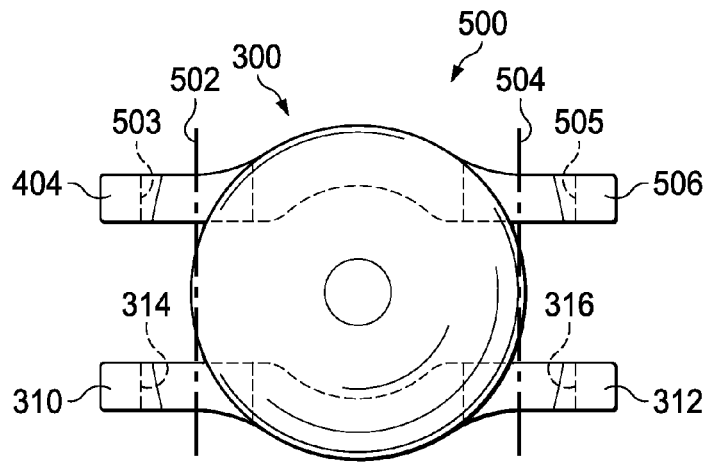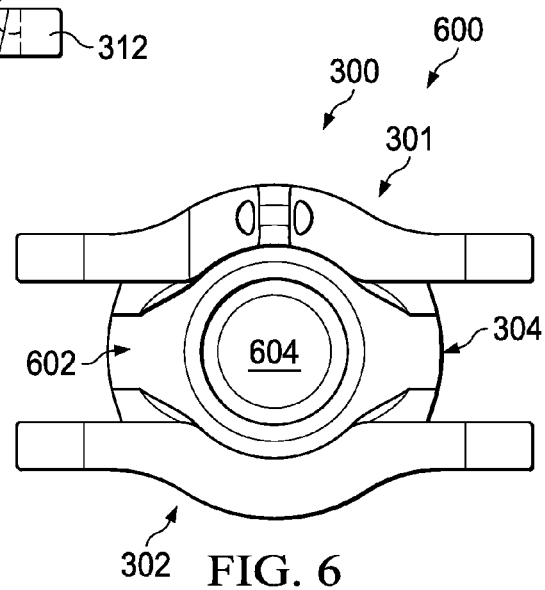
FIG. 5
FIG. 6

LOCKING QUICK-RELEASE PIN ASSEMBLY

BACKGROUND INFORMATION

1. Field

The present disclosure relates generally to maintenance procedures and, in particular, to lockout-tagout. More particularly, the present disclosure relates to a method and apparatus for a locking quick-release pin assembly.

2. Background

Lockout-tagout is a safety procedure used to protect workers when equipment is undergoing maintenance. Lockout-tagout involves a physical restraint to prevent equipment from being energized or started. In some instances, lockout-tagout may prevent the release of hazardous energy. In other instances, lockout-tagout may prevent equipment from moving.

Prior to performing maintenance on a piece of equipment, the equipment may first be powered down. Afterwards, a shaft of a lock may be placed into a hole of the equipment and the lock may be closed. If multiple locks are desirable, a hasp may be placed into the hole of the equipment and multiple locks may be connected to the hasp.

After placing a lock, an operator may also place a tag through the hole to display the name of the operator and a time for placement of the lock. The operator may remove the key from the lock and take it with him. After placing the lock and the tag, the lock cannot be removed without the key. As a result, a different operator may not inadvertently remove the lock prior to completion of the maintenance. The equipment cannot present a hazardous situation such as hazardous energy or movement without removing the lock.

However, some equipment may not have holes that may accommodate a shaft of a lock. This equipment may not be able to use a traditional padlock to lockout-tagout the equipment.

Some equipment may have holes that accommodate quick-release pins. Quick-release pins may be placed into the holes to prevent equipment from being energized or started. However, quick-release pins are easily removed by anyone. Removing a quick-release pin prior to completing maintenance may create a hazardous condition.

Therefore, it would be desirable to have a method and apparatus that take into account at least some of the issues discussed above, as well as other possible issues. For example, it may be desirable to provide lockout-tagout components that can be used with equipment that cannot receive traditional locks with shackles.

SUMMARY

In an illustrative embodiment, a cover for a locking quick-release pin assembly is provided. The cover comprises a body. The body has an opening at a first end, a domed second end, and a plurality of tabs extending from the body. Each tab of the plurality of tabs has a hole. Each hole is concentric with another hole of another tab of the plurality of tabs.

In another illustrative embodiment, a locking quick-release pin assembly is provided. The locking quick-release pin assembly comprises a quick-release pin and a cover. The quick-release pin has a button portion, a handle portion, and a shank portion. The handle portion is positioned between the button portion and the shank portion. The cover has a body and a plurality of tabs extending from the body. The body has a cavity configured to conceal the button portion. Each tab of the plurality of tabs has a hole configured to receive a shackle of a lock on a shank-side of the handle portion. The shank-side of the handle is an opposite side of the handle portion from the button portion.

A further illustrative embodiment of the present disclosure may provide a method of locking a quick-release pin. The method comprises placing a cover over a handle portion of the quick-release pin to conceal a button portion of the quick-release pin. The quick-release pin further comprises a shank portion. The handle portion is between the shank portion and the button portion. The cover has a body with a cavity concealing the button portion and a plurality of tabs extending from the body. Each tab of the plurality of tabs has a hole configured to receive a first shackle of a first lock on a shank-side of the handle portion. The shank-side of the handle portion is an opposite side of the handle portion from the button portion. The method further places a first shackle of a first lock through a first hole of a first tab of the plurality of tabs and a second hole of a second tab of the plurality of tabs.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 3 is an illustration of a front view of a cover in accordance with an illustrative embodiment;

FIG. 4 is an illustration of a side view of a cover in accordance with an illustrative embodiment;

FIG. 5 is an illustration of a top view of a cover in accordance with an illustrative embodiment;

FIG. 6 is an illustration of a bottom view of a cover in accordance with an illustrative embodiment;

DETAILED DESCRIPTION

Figure 1:
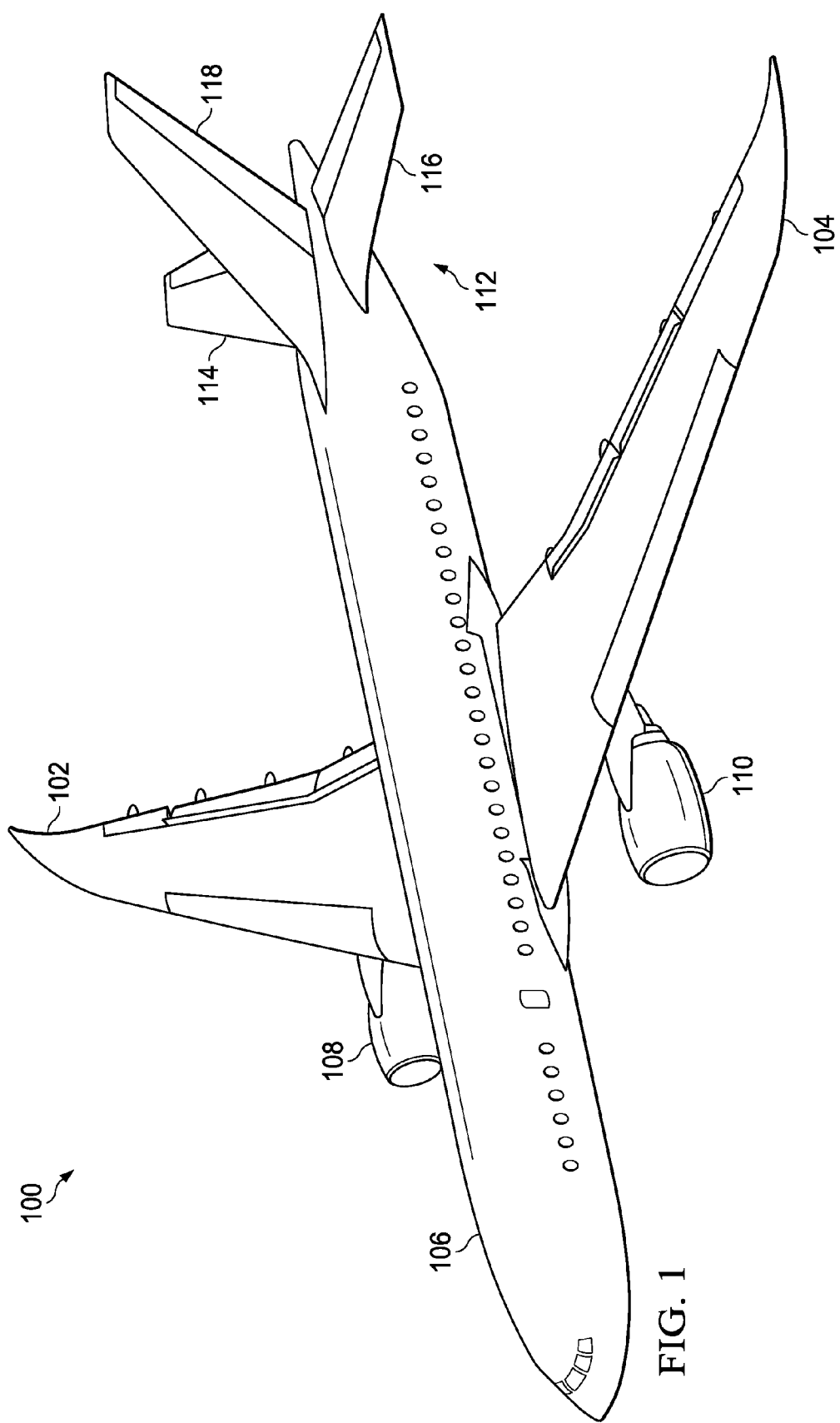
FIG. 1 is an illustration of an aircraft in accordance with an illustrative embodiment.

With reference now to the figures, and in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft having movable components that may be desirably restricted using a during maintenance in accordance with an illustrative embodiment. For example, a locking quick-release pin assembly may restrict movement of movable surfaces of at least one of wing 102 or wing 104 in accordance with an illustrative embodiment. This illustration of aircraft 100 is provided for purposes of illustrating one environment in which the different illustrative embodiments may be implemented. The illustration of aircraft 100 in FIG. 1 is not meant to imply architectural limitations as to the manner in which different illustrative embodiments may be implemented. For example, aircraft 100 is shown as a commercial passenger aircraft. The different illustrative embodiments may be applied to other types of aircraft, such as private passenger aircraft, a rotorcraft, and other suitable type of aircraft.

Figure 2:
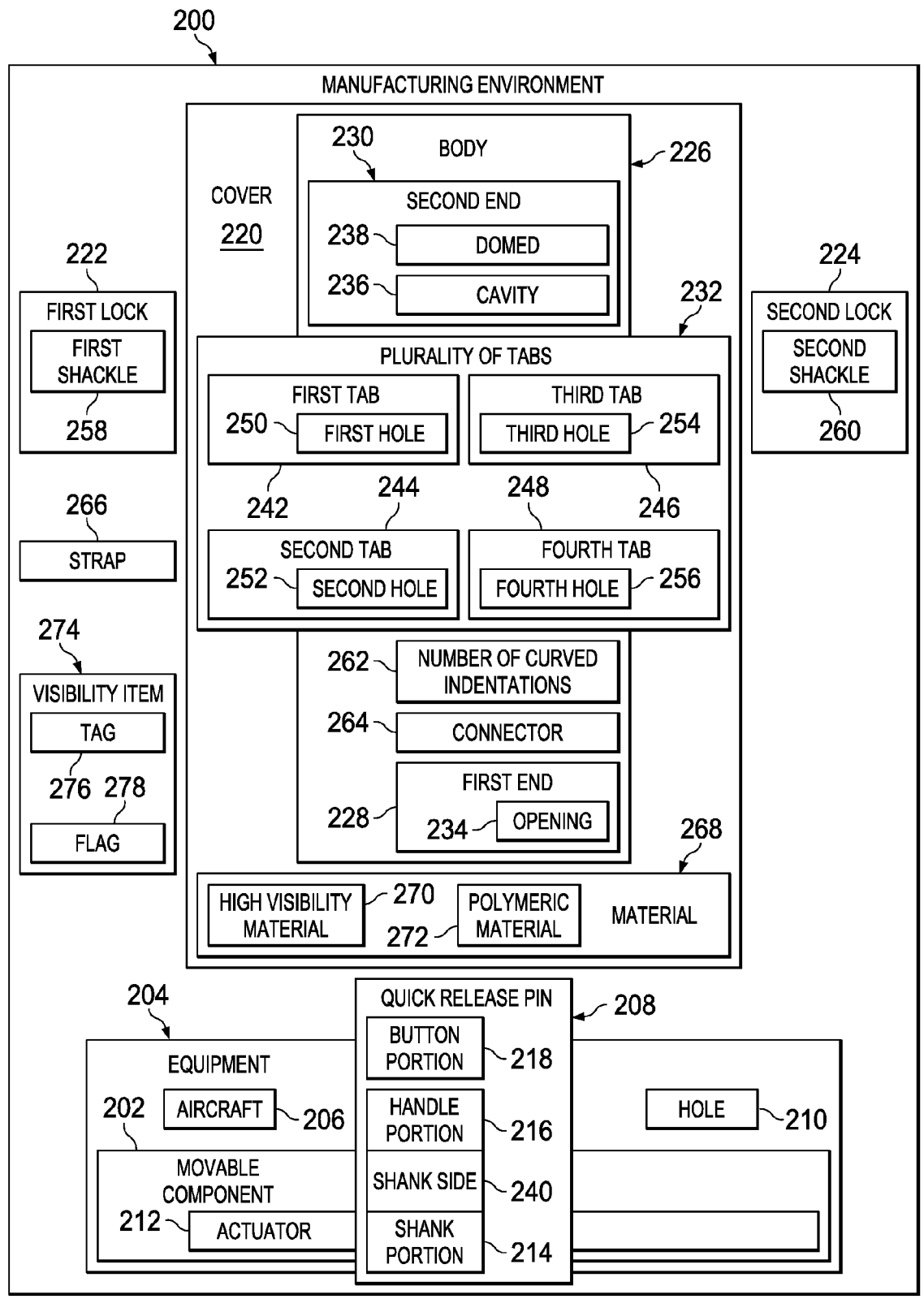
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Manufacturing environment 200 may be used to stop movable component 202 of equipment 204 during maintenance. In some illustrative examples, equipment 204 may be aircraft 206. Aircraft 100 may be a physical implementation of aircraft 206.

During maintenance of equipment 204, movement of movable component 202 may be hazardous. Quick-release pin 208 may be inserted into hole 210 of equipment 204 to prevent movement of movable component 202. Hole 210 may be present in any desirable component of equipment 204. In some examples, hole 210 may be present in movable component 202 of equipment 204. In other examples, hole 210 may be present in actuator 212 that is associated with movable component 202. Actuator 212 may be a motor for moving movable component 202 of equipment 204.

Quick-release pin 208 may prevent undesirable motion of movable component 202 while shank portion 214 of quick-release pin 208 is present in hole 210. However, quick-release pin 208 may be removed by any operator.

Quick-release pin 208 includes shank portion 214, handle portion 216, and button portion 218. Shank portion 214 may have an elongate shape. In some illustrative examples, shank portion 214 may be a cylindrical shaft. Shank portion 214 may have a number of ball detents to hold quick-release pin 208 in hole 210. As used herein, a "number of" items may include one or more items.

Handle portion 216 may be positioned between shank portion 214 and button portion 218. Handle portion 216 may provide leverage for removal of quick-release pin 208 from hole 210. For example, handle portion 216 may have a number of arms extending from quick-release pin 208. An operator may place their fingers beneath the number of arms while depressing button portion 218. Button portion 218 may be depressed to release shank portion from hole 210. When quick-release pin 208 includes a number of ball detents, depressing button portion 218 may activate the number of ball detents allowing for removal of quick-release pin 208 from hole 210.

To prevent undesirable removal of quick-release pin 208 from hole 210, cover 220 may be placed over button portion 218 of quick-release pin 208. Cover 220 may prevent an operator from depressing button portion 218 of quick-release pin 208. By preventing depression of button portion 218, quick-release pin 208 may not be removed from hole 210.

Cover 220 may be secured over button portion 218 using at least one of first lock 222 or second lock 224. As used herein, the phrase "at least one of," when used with a list of items, means different combinations of one or more of the listed items may be used and only one of each item in the list may be needed. In other words, "at least one of" means any combination of items and number of items may be used from the list but not all of the items in the list are required. The item may be a particular object, thing, or a category.

For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations.

Cover 220 has body 226. Body 226 has first end 228, second end 230, and plurality of tabs 232. First end 228 has opening 234. Button portion 218 may be inserted into opening 234 to place cover 220 over quick-release pin 208. Second end 230 has cavity 236. Cavity 236 may contain button portion 218 after cover 220 is placed over quick-release pin 208.

Second end 230 may have any desirable shape. In some illustrative example, second end 230 may be domed 238. When second end 230 is domed 238, second end 230 may not have any sharp or pointed edges. When second end 230 is domed 238, an operator may not accidentally injure themselves on second end 230 of body 226. When second end 230 is domed 238, second end 230 may be referred to as a domed second end.

Plurality of tabs 232 extend from body 226 of cover 220. In this illustrative example, plurality of tabs 232 includes two pairs of tabs. Each tab of plurality of tabs 232 has a hole. Each hole is concentric with another hole of another tab of plurality of tabs 232. Each tab of plurality of tabs 232 has a hole configured to receive a shackle of a lock on shank side 240 of quick-release pin 208.

As depicted, plurality of tabs 232 includes first tab 242, second tab 244, third tab 246, and fourth tab 248. First tab 242 has first hole 250. First hole 250 is configured to receive a shackle of a lock such as first lock 222 or second lock 224. Second tab 244 has second hole 252. Second hole 252 is configured to receive a shackle of a lock such as first lock 222 or second lock 224. Third tab 246 has third hole 254. Third hole 254 is configured to receive a shackle of a lock such as first lock 222 or second lock 224. Fourth tab 248 has fourth hole 256. Fourth hole 256 is configured to receive a shackle of a lock such as first lock 222 or second lock 224.

First hole 250 may be concentric with second hole 252. Third hole 254 may be concentric with fourth hole 256. In some illustrative examples, each of first hole 250, second hole 252, third hole 254, and fourth hole 256 may be substantially perpendicular to shank portion 214 of quick-release pin 208 when cover 220 is over button portion 218.

When cover 220 is placed over button portion 218 of quick-release pin 208, first hole 250, second hole 252, third hole 254, and fourth hole 256 may be positioned on shank side 240 of handle portion 216. In other words, handle portion 216 may be positioned between each of first hole 250, second hole 252, third hole 254, fourth hole 256, and button portion 218.

After positioning cover 220 over button portion 218 of quick-release pin 208, first shackle 258 of first lock 222 may be placed into first hole 250 of first tab 242 of plurality of tabs 232 and second hole 252 of second tab 244 of plurality of tabs 232. First lock 222 may be locked using any conventional method while first shackle 258 extends through first hole 250 and second hole 252.

First lock 222 may prevent removal of cover 220 from button portion 218 of quick-release pin 208. To remove first lock 222, an operator would need to have possession of at least one of a key or a key code specific to first lock 222. As a result, first lock 222 may not be removed by an unauthorized individual. First lock 222 may prevent unauthorized removal of quick-release pin 208 from hole 210.

In some illustrative examples, it may be desirable for cover 220 to have multiple locks attached simultaneously. For example, if maintenance is to be performed by two operators, each operator may place a lock, such as first lock 222 and second lock 224. Each operator would only remove their respective lock after performing their portion of the maintenance. As another example, maintenance may require two signoffs to confirm completion. Each operator may remove their respective lock only after having confirmed that maintenance is completed. In some illustrative examples, operators may work in shifts, a first operator may pass responsibility for maintenance to a second operator. The first operator may only remove their respective lock, such as first lock 222, after the second operator has secured their respective lock, such as second lock 224.

After positioning cover 220 over button portion 218 of quick-release pin 208, second shackle 260 of second lock 224 may be placed into third hole 254 of third tab 246 of plurality of tabs 232 and fourth hole 256 of fourth tab 248 of plurality of tabs 232. Second lock 224 may be locked using any conventional method while second shackle 260 extends through third hole 254 and fourth hole 256.

Second lock 224 may prevent removal of cover 220 from button portion 218 of quick-release pin 208. To remove second lock 224, an operator would need to have possession of at least one of a key or a key code specific to second lock 224. As a result, second lock 224 may not be removed by an unauthorized individual. Second lock 224 may prevent unauthorized removal of quick-release pin 208 from hole 210.

In some illustrative examples, first lock 222 and second lock 224 may extend through respective holes of plurality of tabs 232 at the same time. Although second lock 224 is described as extending through third hole 254 and fourth hole 256, in some examples, second lock 224 may extend through first hole 250 and second hole 252. Further, although first lock 222 is described as extending through first hole 250 and second hole 252, in some illustrative examples, first lock 222 may extend through third hole 254 and fourth hole 256.

In some illustrative examples, body 226 may also have number of curved indentations 262. Number of curved indentations 262 of cover 220 may accommodate handle portion 216. Number of curved indentations 262 may be substantially complementary to handle portion 216. Each of number of curved indentations may contact a respective arm of handle portion 216.

In some illustrative examples, body 226 may also include connector 264. Connector 264 may be any desirable form to interact with strap 266. For example, connector 264 may be an extension with a hole. Strap 266 may extend through the hole. Strap 266 may also be attached to a component of quick-release pin 208. For example, strap 266 may extend through a hole in handle portion 216. When strap 266 is connected to both cover 220 and quick-release pin 208, cover 220 may be tethered to quick-release pin 208. Strap 266 may prevent loss of cover 220 after removal from over button portion 218 of quick-release pin 208. Strap 266 may reduce cost from lost or dropped covers such as cover 220. Further, strap 266 may reduce the chance of injury to operators due to falling covers, such as cover 220, following removal from quick-release pin 208.

Cover 220 may be formed of material 268. Material 268 may be selected for desirable properties. It may be desirable for cover 220 to be easily identified. Visibility of cover 220 may be increased by selection of material 268. For example, material 268 may be formed of high visibility material 270. High visibility material 270 may have a desired color or desired luminescence. For example, high visibility material 270 may be formed of a material having a color easily visible against equipment 204. In some illustrative examples, equipment 204 may be primarily grey. High visibility material 270 may be yellow, orange, red, or some other desirable color distinguishable against equipment 204. In some illustrative examples, high visibility material 270 may be a neon color. As another example, high visibility material 270 may be phosphorescent.

It may be desirable for cover 220 to be inexpensive. Material 268 may be selected based on price. In some illustrative examples, it may be desirable for cover 220 to be manufactured using injection molding. In these illustrative examples, material 268 may be polymeric material 272.

Other items other than first lock 222 or second lock 224 may be inserted into at least one of first hole 250, second hole 252, third hole 254, or fourth hole 256. For example, visibility item 274 may be inserted into at least one of first hole 250, second hole 252, third hole 254, or fourth hole 256. Visibility item 274 may increase the visibility of cover 220 to remind operators to remove cover 220 prior to placing equipment 204 into use. Visibility item 274 may take the form of tag 276 or flag 278. Tag 276 may be a paper tag or plastic tag. Tag 276 may convey information such as the name of the operator who placed a lock, the time the lock was placed, or the type of maintenance being performed. Tag 276 may be a high visibility color such as yellow, orange, or red. Tag 276 may be substantially larger than cover 220.

Flag 278 may be formed of a flexible material. In some illustrative examples, flag 278 may be a thin polymeric material capable of being sent through at least one of first hole 250, second hole 252, third hole 254, or fourth hole 256. Flag 278 may be a high visibility color such as yellow, orange, or red.

Quick-release pin 208 and any desirable components to prevent undesirable removal of quick-release pin 208 from hole 210 may be referred to as a locking quick-release pin assembly. A locking quick-release pin assembly may include quick-release pin 208 and cover 220. In some illustrative examples, the locking quick-release pin assembly may further include at least one of first lock 222, second lock 224, strap 266, or visibility item 274.

Turning now to FIG. 3, an illustration of a front view of a cover is depicted in accordance with an illustrative embodiment. Cover 300 may be a physical implementation of cover 220 shown in block form in FIG. 2. Cover 300 includes body 301. Body 301 has first end 302, second end 304, and plurality of tabs 306. In this illustrative example, second end 304 is domed 308. In this illustrative example, second end 304 may be referred to as a domed second end.

Plurality of tabs 306 includes first tab 310 and third tab 312. First tab 310 has first hole 314. Third tab 312 has third hole 316.

Turning now to FIG. 4, an illustration of a side view of a cover is depicted in accordance with an illustrative embodiment. View 400 is a side view of cover 300 of FIG. 3. Body 301 of cover 300 has curved indentation 402 between first tab 310 and second tab 404.

Turning now to FIG. 5, an illustration of a top view of a cover is depicted in accordance with an illustrative embodiment. View 500 is a top view of cover 300 of FIG. 3. As depicted, first hole 314 of first tab 310 may be centered on axis 502. Second hole 503 in second tab 404 is concentric with first hole 314. Third hole 316 is centered on axis 504. Fourth hole 505 in fourth tab 506 is concentric with third hole 316.

Turning now to FIG. 6, an illustration of a bottom view of a cover is depicted in accordance with an illustrative embodiment. View 600 is a bottom view of cover 300 of FIG. 3. Opening 602 in first end 302 is visible in view 600. Opening 602 extends into body 301 to form cavity 604 in second end 304.

Figure 7:
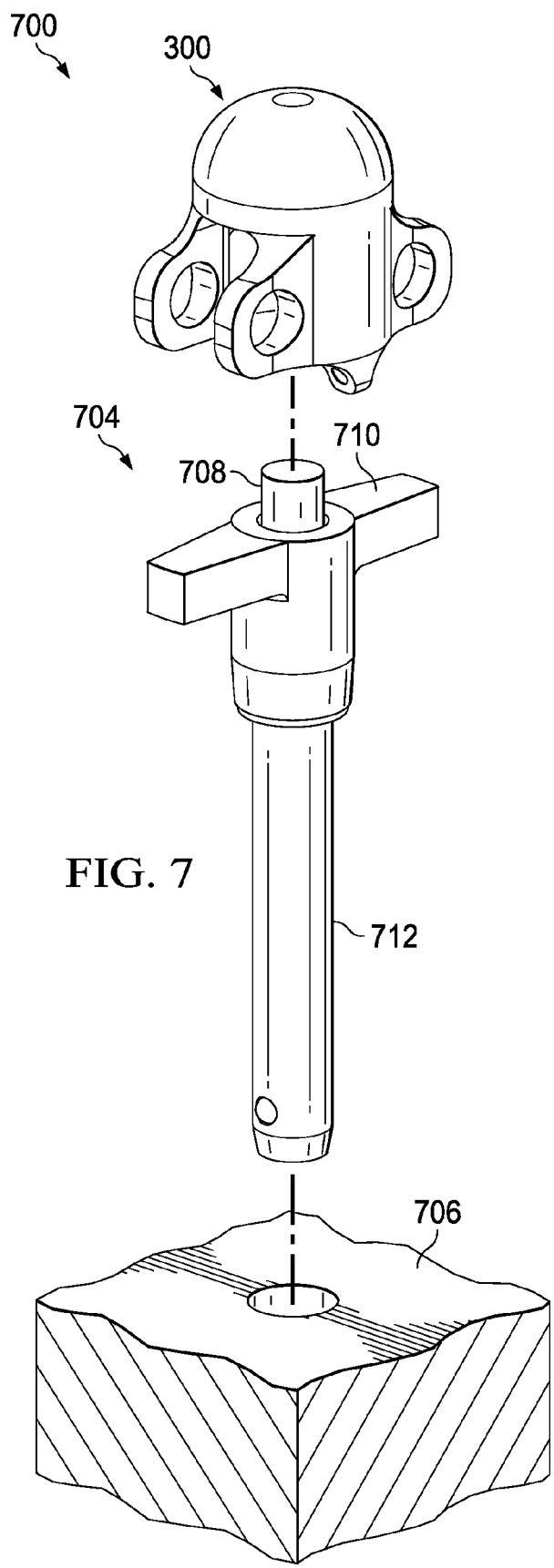
FIG. 7 is an illustration of a manufacturing environment in accordance with an illustrative embodiment.

Turning now to FIG. 7, an illustration of a manufacturing environment is depicted in accordance with an illustrative embodiment. Manufacturing environment 700 may be a physical implementation of manufacturing environment 200 shown in block form in FIG. 2. Manufacturing environment 700 may include cover 300, quick-release pin 704, and equipment 706. Quick-release pin 704 may be a physical implementation of quick-release pin 208 of FIG. 2. Quick-release pin 704 includes button portion 708, handle portion 710, and shank portion 712.

Shank portion 712 of quick-release pin 704 may be placed into a hole of equipment 706. Cover 300 may then be placed over button portion 708. Cover 300 and quick-release pin 704 may be referred to as a locking quick-release pin assembly.

Figure 8:
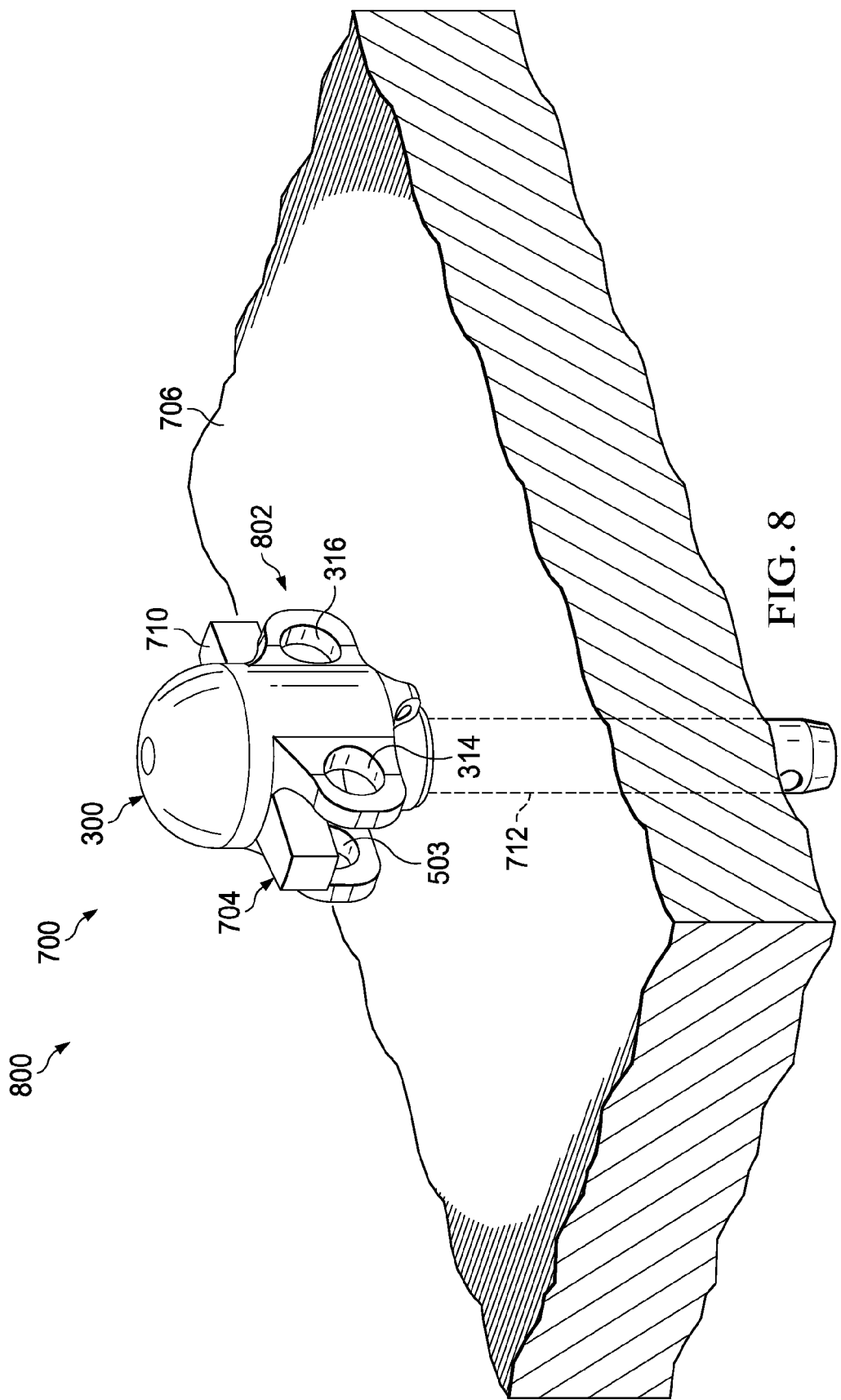
FIG. 8 is an illustration of a manufacturing environment with a cover over a quick-release pin in accordance with an illustrative embodiment.

Turning now to FIG. 8, an illustration of a manufacturing environment with a cover over a quick-release pin is depicted in accordance with an illustrative embodiment. View 800 is a view of manufacturing environment 700 in which shank portion 712 of quick-release pin 704 is present in a hole in equipment 706. As depicted, cover 300 has been placed over button portion 708 of quick-release pin 704. First hole 314, second hole 503, third hole 316, and fourth hole 505 are configured to receive a shackle of a lock on shank-side 802 of handle portion 710.

Figure 9:
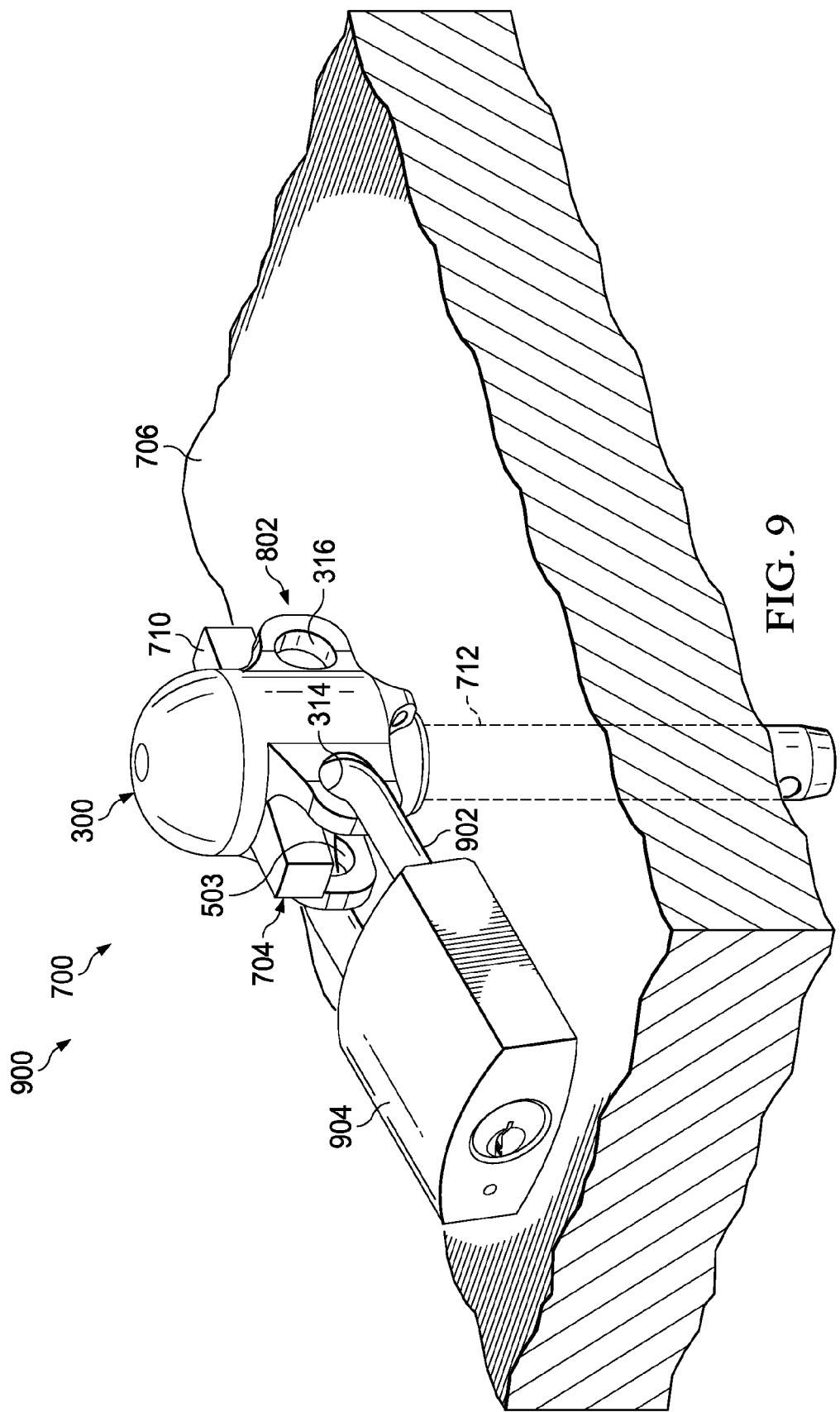
FIG. 9 is an illustration of a manufacturing environment with a lock through a cover in accordance with an illustrative embodiment.

Turning now to FIG. 9, an illustration of a manufacturing environment with a lock through a cover is depicted in accordance with an illustrative embodiment. View 900 is a view of manufacturing environment 700 in which first shackle 902 of first lock 904 extends through first hole 314 and second hole 503 of cover 300. First lock 904 may be a physical implementation of first lock 222 of FIG. 2. Cover 300, quick-release pin 704, and first lock 904 may be referred to as a locking quick-release pin assembly.

Figure 10:
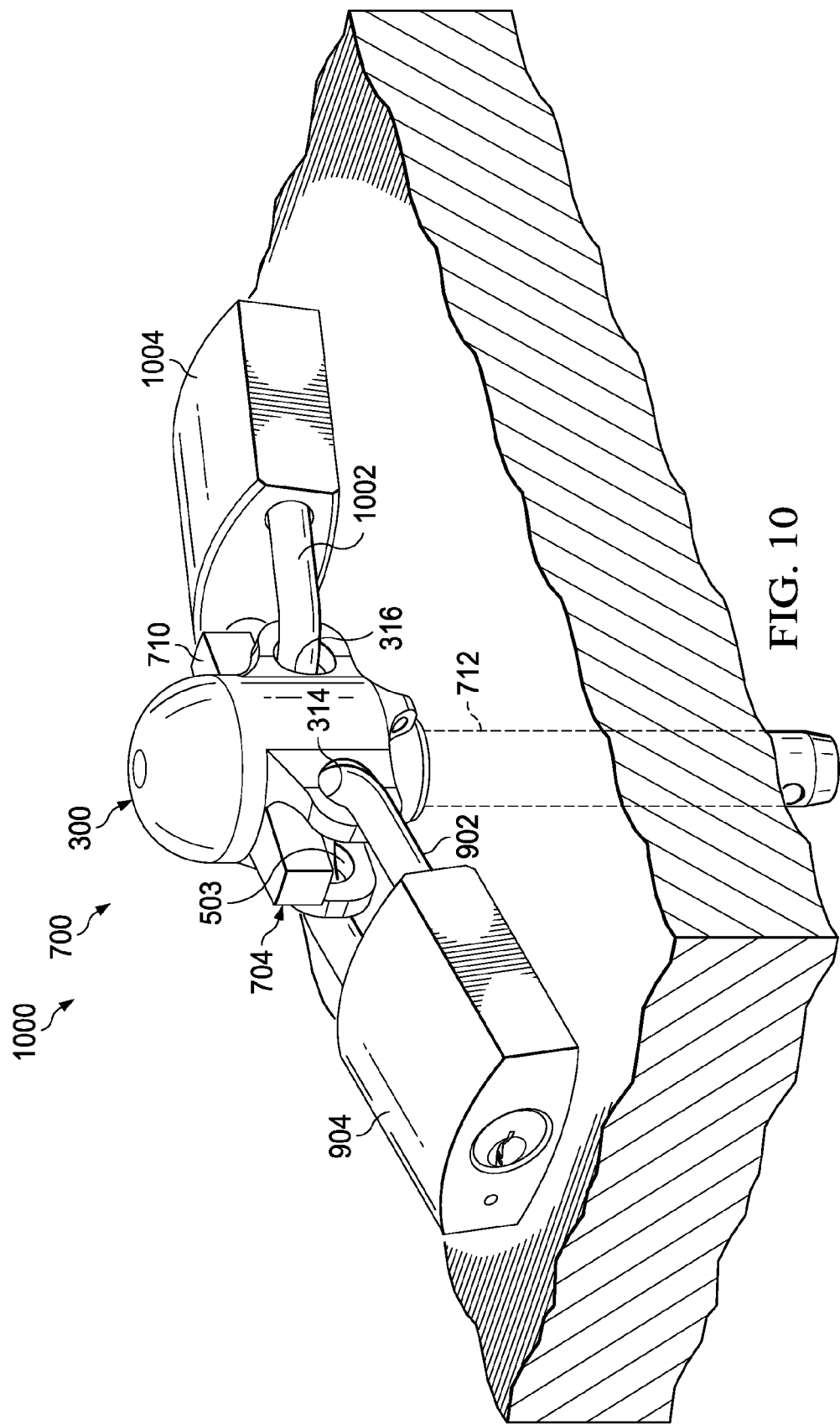
FIG. 10 is an illustration of a manufacturing environment with two locks through a cover in accordance with an illustrative embodiment.

Turning now to FIG. 10, an illustration of a manufacturing environment with two locks through a cover is depicted in accordance with an illustrative embodiment. View 1000 is a view of manufacturing environment 700 in which second shackle 1002 of second lock 1004 extends through third hole 316 and fourth hole 505 of cover 300. Second lock 1004 may be a physical implementation of second lock 224 of FIG. 2. Cover 300, quick-release pin 704, first lock 904, and second lock 1004 may be referred to as a locking quick-release pin assembly.

Figure 11:
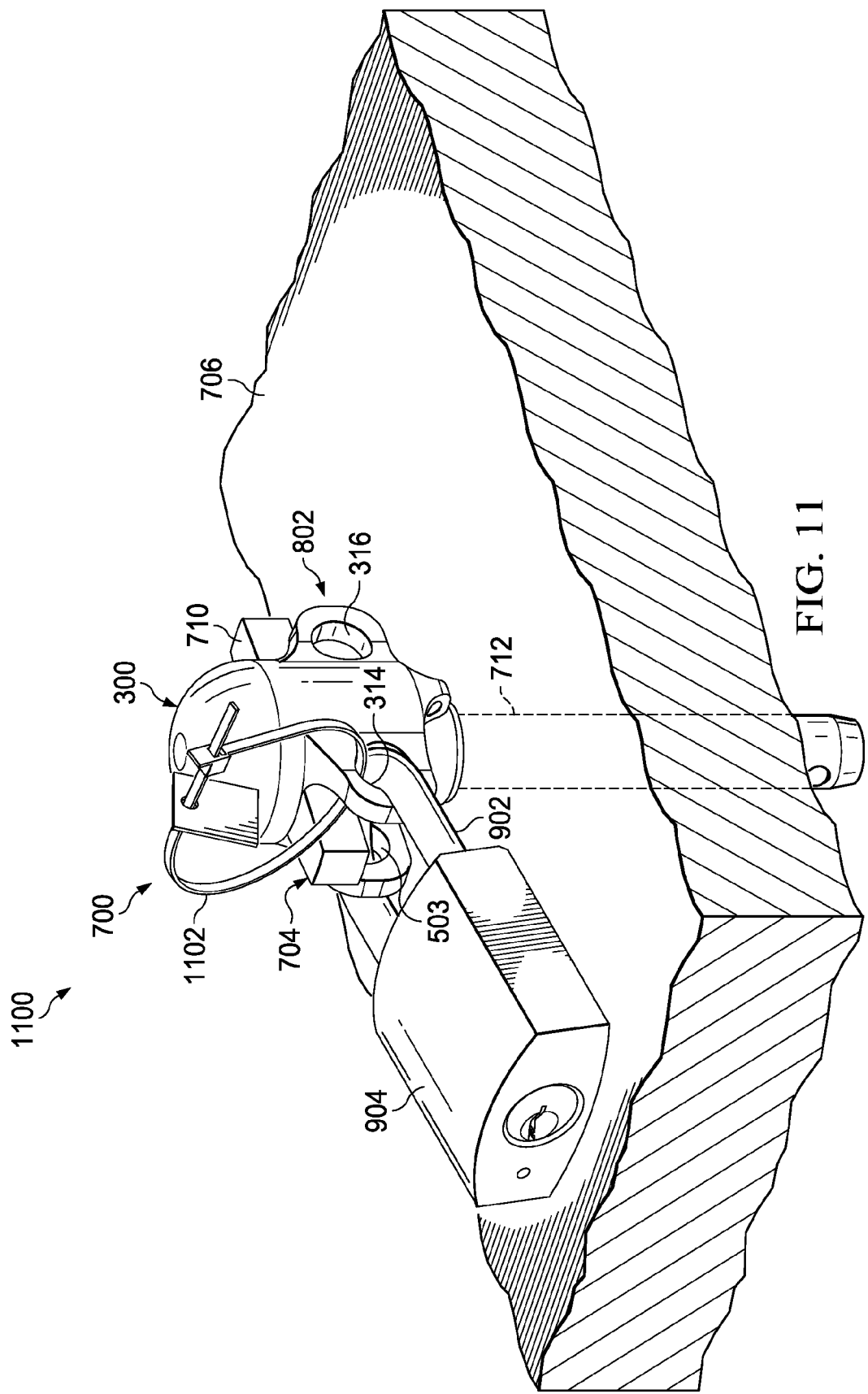
FIG. 11 is an illustration of a manufacturing environment with a lock and a tag through a cover in accordance with an illustrative embodiment.

Turning now to FIG. 11, an illustration of a manufacturing environment with a lock and a tag through a cover is depicted in accordance with an illustrative embodiment. View 1100 is a view of manufacturing environment 700 in which both first shackle 902 of first lock 904 and tag 1102 extend through first hole 314 of cover 300. Tag 1102 may increase visibility of cover 300. Tag 1102 may also convey information related to at least one of first lock 904 or maintenance being performed on equipment 706. Cover 300, quick-release pin 704, tag 1102, and first lock 904 may be referred to as a locking quick-release pin assembly.

Figure 12:
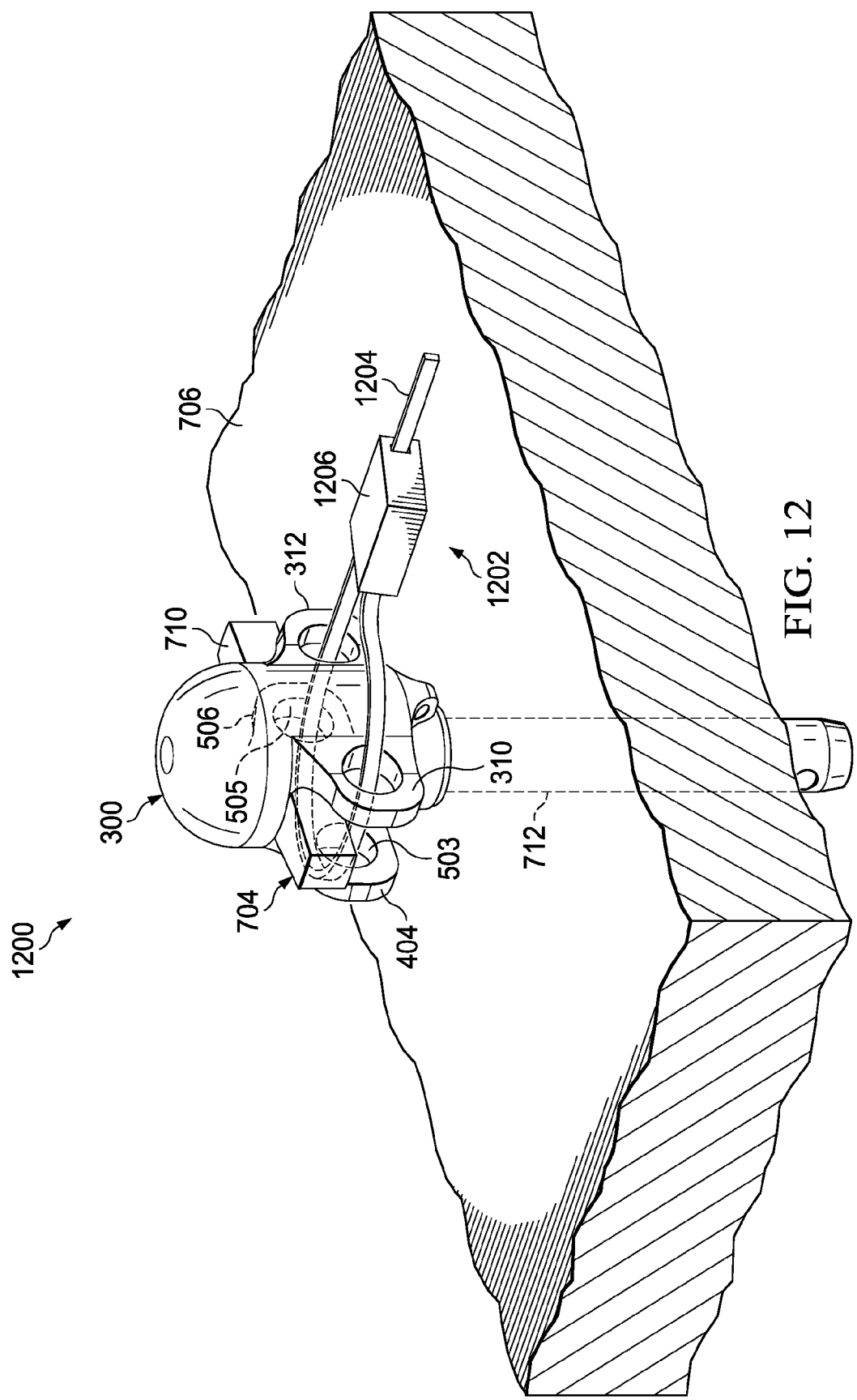
FIG. 12 is an illustration of a manufacturing environment with a locking mechanism through a cover in accordance with an illustrative embodiment.

Turning now to FIG. 12, an illustration of a manufacturing environment with a locking mechanism through a cover is depicted in accordance with an illustrative embodiment. View 1200 is a view of manufacturing environment 700 in which locking mechanism 1202 extends through a respective hole of each of first tab 310, second tab 404, third tab 312, and fourth tab 506. Locking mechanism 1202 has flexible portion 1204 and rigid portion 1206. Flexible portion 1204 extends through a respective hole of each of first tab 310, second tab 404, third tab 312, and fourth tab 506 and into rigid portion 1206. Rigid portion 1206 may directly or indirectly convey information related to maintenance being performed on equipment 706. For example, rigid portion 1206 may have the name of the operator performing the maintenance. In another example, rigid portion 1206 may have a barcode, QR code, or other data that, when scanned, reveals information regarding the maintenance. The information may include at least one of the operator performing the maintenance, the type of maintenance being performed, or the time the maintenance is expected to end. Cover 300, quick-release pin 704, and locking mechanism 1202 may be referred to as a locking quick-release pin assembly.

Figure 13:
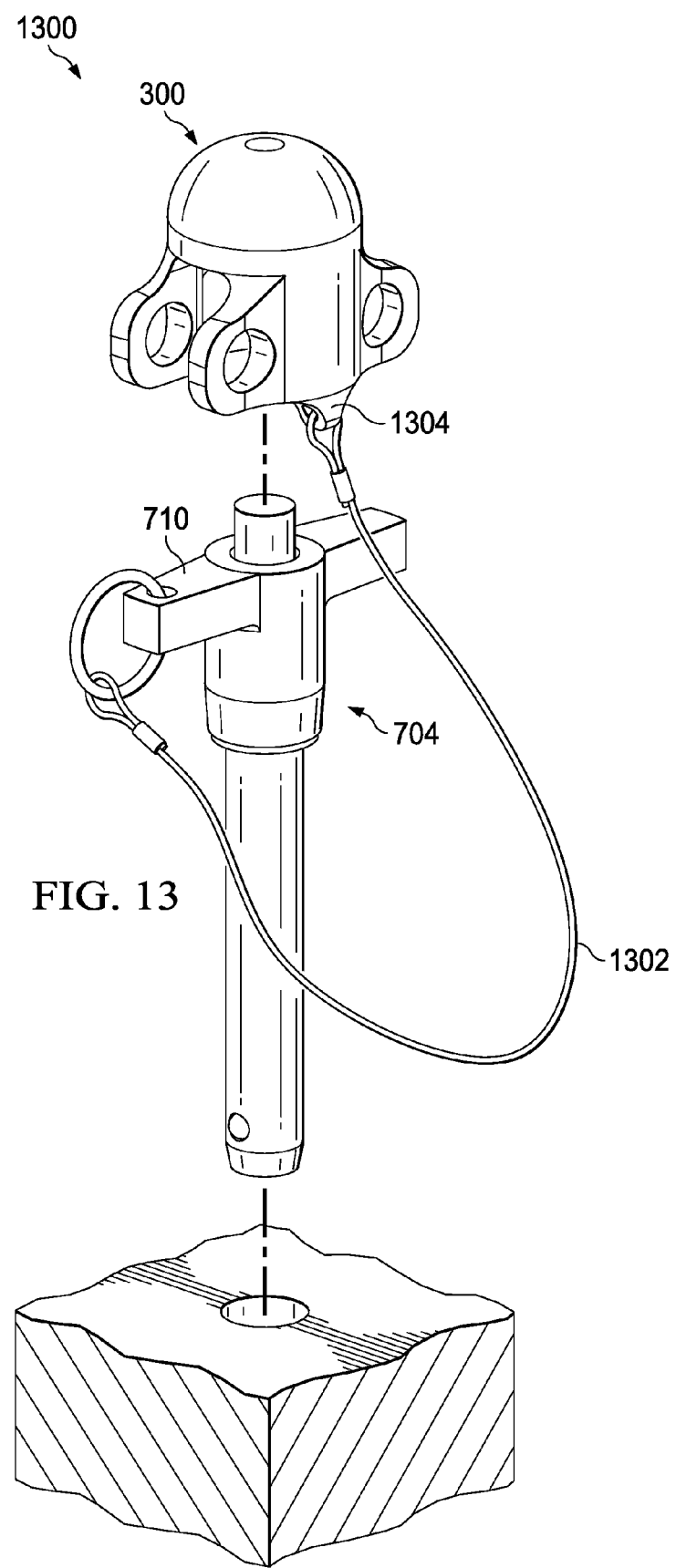
FIG. 13 is an illustration of a manufacturing environment in accordance with an illustrative embodiment.

Turning now to FIG. 13, an illustration of a manufacturing environment is depicted in accordance with an illustrative embodiment. View 1300 is a view of manufacturing environment 700 with an optional component connecting cover 300 and quick-release pin 704. In this illustrative example, strap 1302 is inserted through connector 1304 of cover 300. Strap 1302 is also inserted through handle portion 710 of quick-release pin 704. Cover 300, quick-release pin 704, and strap 1302 may be referred to as a locking quick-release pin assembly.

Figure 14:
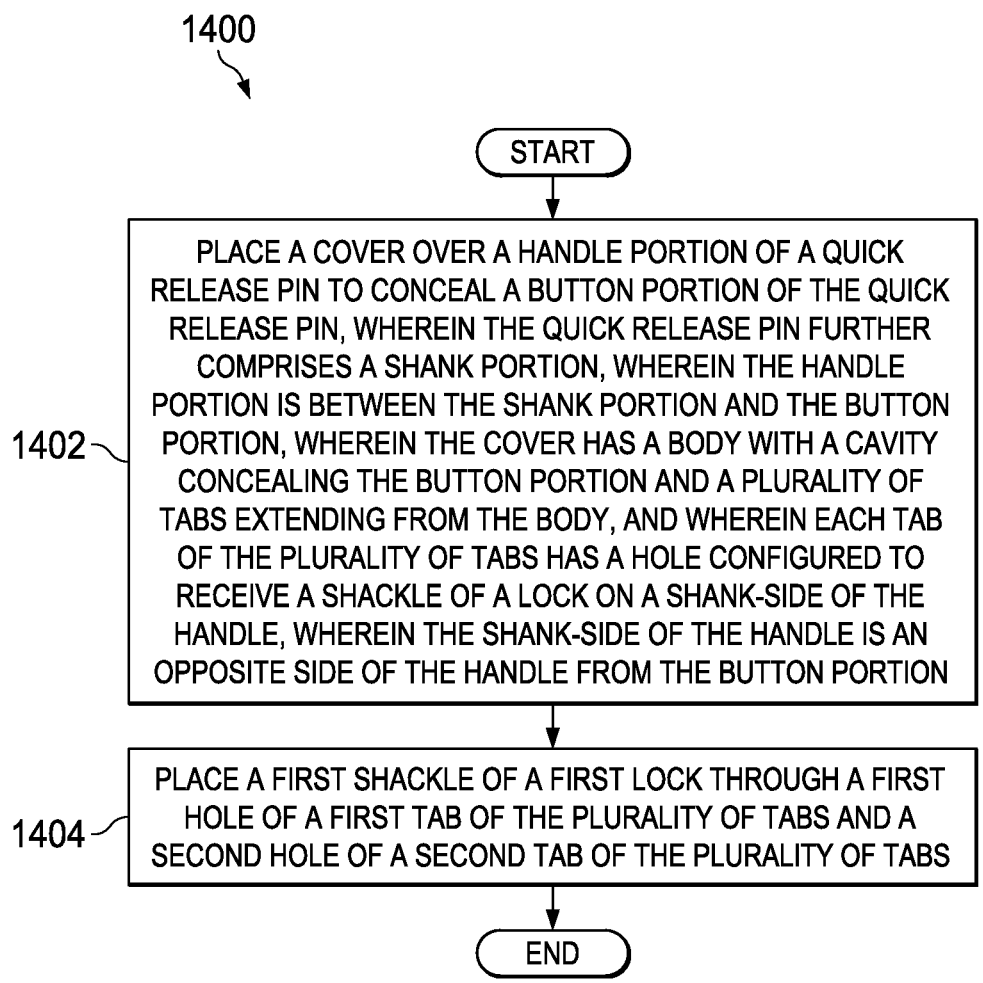
FIG. 14 is an illustration of a flowchart of a process for locking a quick-release pin in accordance with an illustrative embodiment.

Turning now to FIG. 14, an illustration of a flowchart of a process for locking a quick-release pin is depicted in accordance with an illustrative embodiment. Process 1400 may be a process for lockout-tagout of quick-release pin 208 shown in block form in FIG. 2. Process 1400 may be a process for performing lockout-tagout on a component of aircraft 100 of FIG. 1. Process 1400 may be performed using cover 300 of FIGS. 3-13.

Process 1400 may begin by placing a cover over a handle portion of a quick-release pin to conceal a button portion of the quick-release pin, wherein the quick-release pin further comprises a shank portion, wherein the handle portion is between the shank portion and the button portion, wherein the cover has a body with a cavity concealing the button portion and a plurality of tabs extending from the body, and wherein each tab of the plurality of tabs has a hole configured to receive a shackle of a lock on a shank-side of the handle, wherein the shank-side of the handle is an opposite side of the handle from the button portion (operation 1402). Process 1400 may then place a first shackle of a first lock through a first hole of a first tab of the plurality of tabs and a second hole of a second tab of the plurality of tabs (operation 1404). Afterwards the process terminates.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

In some illustrative examples, process 1400 may also place a second shackle of a second lock through a third hole of a third tab of the plurality of tabs and a fourth hole of a fourth tab of the plurality of tabs. Process 1400 may further remove the first shackle of the first lock from the first hole and the second hole after placing the second shackle of the second lock through the third hole and the fourth hole.

In some illustrative examples, process 1400 places a tag through at least one hole of the plurality of tabs. In other illustrative examples, process 1400 removes the first shackle of the first lock from the first hole and the second hole and removes the cover from the quick-release pin. Process 1400 may further remove the quick-release pin from a piece of equipment.

Figure 15:
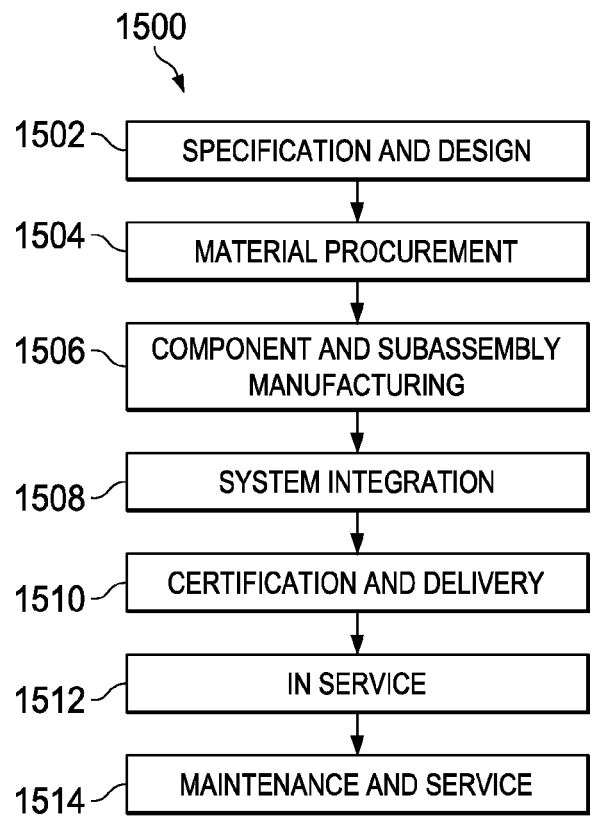
FIG. 15 is an illustration of an aircraft manufacturing and service method in the form of a block diagram in accordance with an illustrative embodiment.
Figure 16:
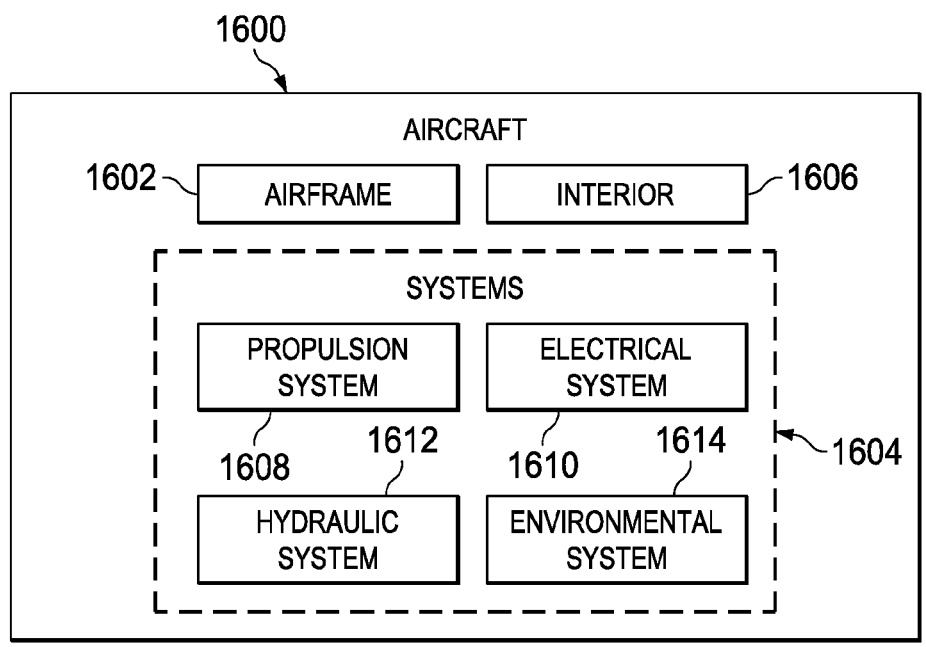
FIG. 16 is an illustration of an aircraft in the form of a block diagram in which an illustrative embodiment may be implemented.

The illustrative embodiments of the present disclosure may be described in the context of aircraft manufacturing and service method 1500 as shown in FIG. 15 and aircraft 1600 as shown in FIG. 16. Turning first to FIG. 15, an illustration of an aircraft manufacturing and service method is depicted in the form of a block diagram in accordance with an illustrative embodiment. During pre-production, aircraft manufacturing and service method 1500 may include specification and design 1502 of aircraft 1600 of FIG. 16 and material procurement 1504.

During production, component and subassembly manufacturing 1506 and system integration 1508 of aircraft 1600 of FIG. 16 takes place. Thereafter, aircraft 1600 of FIG. 16 may go through certification and delivery 1510 in order to be placed in service 1512. While in service 1512 by a customer, aircraft 1600 of FIG. 16 is scheduled for routine maintenance and service 1514, which may include modification, reconfiguration, refurbishment, and other maintenance or service.

Each of the processes of aircraft manufacturing and service method 1500 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 16, an illustration of an aircraft is depicted in the form of a block diagram in which an illustrative embodiment may be implemented. In this example, aircraft 1600 is produced by aircraft manufacturing and service method 1500 of FIG. 15 and may include airframe 1602 with systems 1604 and interior 1606. Examples of systems 1604 include one or more of propulsion system 1608, electrical system 1610, hydraulic system 1612, and environmental system 1614. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1500 of FIG. 15. One or more illustrative embodiments may be used during component and subassembly manufacturing 1506. For example, cover 220 of FIG. 2 may be used to prevent movement of components of aircraft 1600 of FIG. 16 during component and subassembly manufacturing 1506. In some examples, cover 220 of FIG. 2 may be used to prevent movement of components of aircraft 1600 of FIG. 16 during maintenance and service 1514.

Thus the illustrative embodiments provide a method and apparatus for locking a quick-release pin. Locking a quick-release pin may reduce chances of injury from movement of a movable component during maintenance. Cover 220 may be placed over quick-release pin 208 when quick-release pin 208 is in hole 210 of equipment 204. Cover 220 of FIG. 2 may prevent quick-release pin 208 from being undesirably removed from equipment 204.

At least one of first lock 222 or second lock 224 may be attached to cover 220 to prevent cover 220 from being undesirably removed from quick-release pin 208. For example, a respective shackle of first lock 222 or second lock 224 may be placed through two holes of plurality of tabs 232.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system comprising:
   a piece of equipment;
   a quick-release pin associated with the piece of equipment, wherein the quick-release pin comprises a button portion configured to enable the quick-release pin to be removed from the piece of equipment when the button portion is depressed;
   a lock comprising a shackle; and
   a cover associated with the quick-release pin, the cover comprising a body with an opening at a first end, a domed second end, and a plurality of tabs extending from the body, wherein:
   each tab of the plurality of tabs has a hole;

each hole of each tab of the plurality of tabs is concentric with another hole of another tab of the plurality of tabs;

each hole of each tab of the plurality of tabs is configured to receive the shackle of the lock, wherein concentric holes are configured to receive the shackle simultaneously; and the cover is configured to prevent access to the quick-release pin when the shackle of the lock is located in at least one hole of at least one tab of the plurality of tabs.

2. The system of claim 1, wherein the plurality of tabs comprises:

two pairs of tabs.

3. The system of claim 1, wherein the body includes a number of curved indentations configured to contact a handle portion of the quick-release pin.

4. The system of claim 1, wherein the body further comprises:

a connector configured to receive a strap.

5. The system of claim 1, wherein the cover is formed of a high visibility material, wherein high visibility material is defined as a material distinguishable against a color of the piece of equipment.

6. The system of claim 1, wherein the cover is formed of a polymeric material.

7. The system of claim 5, wherein the high visibility material is further defined as having a desired color or a desired luminescence.

8. The system of claim 1, wherein the quick-release pin comprises a number of ball detents and wherein the button portion is further configured to activate the number of ball detents when the button portion is depressed.

9. A locking quick-release pin assembly comprising:

a quick-release pin with a button portion, a handle portion, and a shank portion, wherein the handle portion is positioned between the button portion and the shank portion and wherein the button portion is configured to enable the quick-release pin to be removed from a piece of equipment when the button portion is depressed; and a cover having a body and a plurality of tabs extending from the body, wherein:

the body has a cavity configured to conceal the button portion;

each tab of the plurality of tabs has a hole configured to receive a shackle of a lock on a shank-side of the handle portion;

the shank-side of the handle portion is an opposite side of the handle portion from the button portion; and the cover is configured to prevent access to the quick-release pin when the shackle of the lock is located in at least one hole of at least one tab of the plurality of tabs.

10. The locking quick-release pin assembly of claim 9 further comprising:

a first lock having a first shackle, wherein the first shackle extends through a first hole in a first tab of the plurality of tabs and a second hole in a second tab of the plurality of tabs.

11. The locking quick-release pin assembly of claim 10 further comprising:

a second lock having a second shackle, wherein the second shackle extends through a third hole in a third tab of the plurality of tabs and a fourth hole in a fourth tab of the plurality of tabs, wherein the shank portion is between the first lock and the second lock.

12. The locking quick-release pin assembly of claim 9, wherein the cover is formed of a high visibility material, wherein high visibility material is defined as a material distinguishable against a color of a piece of equipment associated with the cover and the locking quick-release pin assembly.

13. The locking quick-release pin assembly of claim 9, wherein the cover is formed of a polymeric material.

14. The locking quick-release pin assembly of claim 9, wherein the cover further comprises:

a connector configured to receive a strap.

15. The locking quick-release pin assembly of claim 9 further comprising:

at least one of a flag or a tag extending through at least one hole of the plurality of tabs, wherein a tag comprises an item with an identifying text and a flag comprises a flexible indicator.

16. The locking quick-release pin assembly of claim 15, wherein the identifying text comprises information containing one of an operator name, a time of lock placement, or a type of maintenance performed.

17. The locking quick-release pin assembly of claim 15, wherein the flag further comprises a flexible material sent through the at least one hole.

18. A method of locking a quick-release pin comprising:

placing a cover over a handle portion of the quick-release pin to conceal a button portion of the quick-release pin, wherein the quick-release pin further comprises:

a shank portion, wherein the handle portion is between the shank portion and the button portion, wherein the cover has a body with a cavity concealing the button portion and a plurality of tabs extending from the body, and wherein each tab of the plurality of tabs has a hole configured to receive a shackle of a lock on a shank-side of the handle portion, wherein the shank-side of the handle portion is an opposite side of the handle portion from the button portion; and placing a first shackle of a first lock through a first hole of a first tab of the plurality of tabs and a second hole of a second tab of the plurality of tabs, wherein placing the first shackle of the first lock through the first hole and the second hole causes the cover to prevent access to the quick-release pin.

19. The method of claim 18 further comprising:

placing a second shackle of a second lock through a third hole of a third tab of the plurality of tabs and a fourth hole of a fourth tab of the plurality of tabs.

20. The method of claim 19 further comprising:

removing the first shackle of the first lock from the first hole and the second hole after placing the second shackle of the second lock through the third hole and the fourth hole, wherein placing the second shackle of the second lock through the third hole and the fourth hole causes the cover to prevent access to the quick-release pin.

21. The method of claim 18 further comprising:

placing a flag or a tag through at least one hole of the plurality of tabs, wherein a tag comprises an item with identifying text and a flag comprises a flexible indicator.

* * * * *